(12) United States Patent
Della Fiora et al.

(10) Patent No.: US 10,416,728 B2
(45) Date of Patent: Sep. 17, 2019

(54) TOOL-LESS MULTIPOINT LATCHING MECHANISM

(71) Applicant: Hewlett Packard Enterprise Development LP, Houston, TX (US)

(72) Inventors: Troy A. Della Fiora, Spring, TX (US); John R. Grady, Cypress, TX (US); Joseph Allen, Tomball, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/550,853

(22) PCT Filed: Feb. 20, 2015

(86) PCT No.: PCT/US2015/016817
§ 371 (c)(1),
(2) Date: Aug. 14, 2017

(87) PCT Pub. No.: WO2016/133535
PCT Pub. Date: Aug. 25, 2016

(65) Prior Publication Data
US 2018/0046230 A1 Feb. 15, 2018

(51) Int. Cl.
*G06F 1/18* (2006.01)
*H01R 13/629* (2006.01)
*H01R 12/70* (2011.01)

(52) U.S. Cl.
CPC ......... *G06F 1/186* (2013.01); *H01R 12/7058* (2013.01); *H01R 13/62983* (2013.01)

(58) Field of Classification Search
CPC ................ G06F 1/186; H01R 12/7058; H01R 13/62983

USPC ..................................................... 361/679.43
See application file for complete search history.

(56) References Cited

U.S. PATENT DOCUMENTS

| 4,197,572 | A |   | 4/1980 | Aimar |
| 5,675,472 | A |   | 10/1997 | Hamerton-Kelly |
| 5,793,614 | A | * | 8/1998 | Tollbom ............... H05K 7/1409 361/725 |
| 6,118,668 | A |   | 9/2000 | Scholder et al. |

(Continued)

FOREIGN PATENT DOCUMENTS

| JP | 2000-195643 A | 7/2000 |
| JP | 2014170533 | 9/2014 |

OTHER PUBLICATIONS

International Search Report and Written Opinion received for PCT Application No. PCT/US2015/016817, dated Nov. 19, 2015, 10 pages.

(Continued)

*Primary Examiner* — Rockshana D Chowdhury
(74) *Attorney, Agent, or Firm* — Brooks, Cameron & Huebsch, PLLC

(57) ABSTRACT

In one implementation, a system for a tool-less multipoint latching mechanism includes a number of adjustable cams of a bracket to interact with a number of corresponding cam surfaces located on a computing board, a number of locking locations to couple a printed circuit assembly (PCA) to the bracket, and a number of pin-in-slot joints of the bracket that interact with the number of adjustable cams to vertically lower the coupled PCA into a number of receiving connectors on the computing board.

13 Claims, 4 Drawing Sheets

(56) References Cited

U.S. PATENT DOCUMENTS

| | | |
|---|---|---|
| 6,171,120 B1 | 1/2001 | Bolich |
| 6,267,614 B1* | 7/2001 | Good .................. H01R 13/639 |
| | | 439/160 |
| 6,301,099 B1 | 10/2001 | Felcman et al. |
| 6,315,586 B1 | 11/2001 | Joyce |
| 6,430,644 B1 | 8/2002 | Luen et al. |
| 6,494,729 B1 | 12/2002 | Stathopoulos |
| 6,695,520 B1* | 2/2004 | Sarno .................. H05K 7/1409 |
| | | 292/64 |
| 6,884,096 B2* | 4/2005 | Centola ............ H01R 13/62933 |
| | | 361/798 |
| 7,292,457 B2 | 11/2007 | DeNies et al. |
| 7,381,074 B1 | 6/2008 | Bridges |
| 7,390,194 B1 | 6/2008 | Crippen et al. |
| 7,465,175 B2 | 12/2008 | Crippa et al. |
| 7,535,730 B2 | 5/2009 | Junkins et al. |
| 7,589,974 B2 | 9/2009 | Grady et al. |
| 7,623,357 B2 | 11/2009 | Wallace |
| 7,649,751 B2 | 1/2010 | Nguyen et al. |
| 7,746,665 B2 | 6/2010 | Junkins et al. |
| 8,089,770 B2 | 1/2012 | Olesiewicz |
| 8,366,464 B1 | 2/2013 | Figuerado et al. |
| 8,391,022 B2 | 3/2013 | Olesiewicz |
| 8,432,684 B2 | 4/2013 | Wu et al. |
| 8,472,178 B2 | 6/2013 | Hartman et al. |
| 8,559,170 B2 | 10/2013 | Lee et al. |
| 8,747,132 B1* | 6/2014 | Feroli ..................... G06F 1/185 |
| | | 439/160 |
| 9,048,592 B2 | 6/2015 | Chen et al. |
| 2002/0122304 A1* | 9/2002 | Duncan ................ H05K 7/1409 |
| | | 361/818 |
| 2005/0083659 A1 | 4/2005 | Gattuso |
| 2005/0186816 A1* | 8/2005 | Franz ............... H01R 13/62933 |
| | | 439/157 |
| 2005/0190546 A1 | 9/2005 | Chen et al. |
| 2005/0215098 A1 | 9/2005 | Muramatsu |
| 2006/0160394 A1 | 7/2006 | Korsunsky et al. |
| 2007/0105425 A1 | 5/2007 | Wang |
| 2007/0127225 A1 | 6/2007 | Slaton |
| 2007/0281500 A1 | 12/2007 | Wang |
| 2012/0257360 A1 | 10/2012 | Sun |
| 2014/0098480 A1 | 4/2014 | Foster, Sr. et al. |
| 2014/0187059 A1 | 7/2014 | Takemoto |
| 2015/0064942 A1 | 3/2015 | Takemoto |

OTHER PUBLICATIONS

International Search Report and Written Opinion received for PCT Application No. PCT/US2014/013806, dated Oct. 24, 2014, 8 pages.

* cited by examiner

TOOL-LESS MULTIPOINT LATCHING MECHANISM

BACKGROUND

A printed circuit assembly (PCA) can be coupled to a computing system board (e.g., motherboard, main system board, daughter card, etc.). The PCA can be coupled via a number of electrical connectors and/or a number of brackets and screws to prevent the PCA from being decoupled from the number of electrical connectors. The PCAs can include multiple electrical connectors that can require precision in order to not damage the electrical connectors of the PCA or the electrical connectors of the computing system board when installing or removing the PCAs. Damaging the electrical connectors can cause permanent damage to the PCA and/or the computing system board.

DETAILED DESCRIPTION

Figure 1:
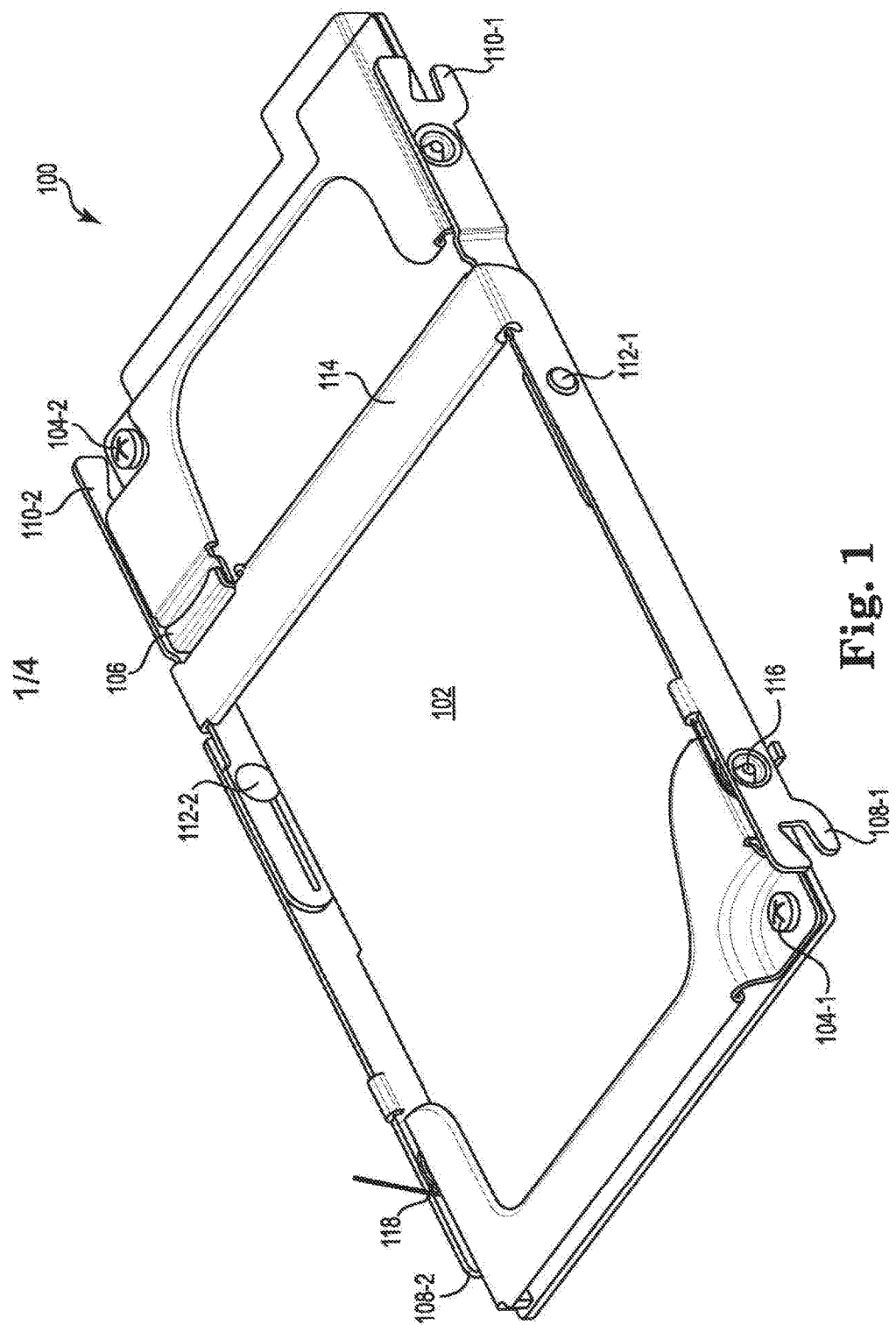
FIG. 1 illustrates a diagram of an example of a tool-less multipoint latching mechanism system consistent with the present disclosure.

A number of systems for a tool-less multipoint latching mechanism are described herein. In one implementation, a system for a tool-less multipoint latching mechanism can include a number of adjustable cams of a bracket to interact with a number of corresponding cam surfaces located on a computing board, a number of locking locations to couple a printed circuit assembly (PCA) to the bracket, and a number of pin-in-slot joints of the bracket that interact with the number of adjustable cams to vertically lower the coupled PCA into a number of receiving connectors on the computing board.

The tool-less multipoint latching mechanism can include a number of springs (e.g., torsion springs, etc.) that can be positioned between a number of adjustable cams and a number of pin-in-slot joints to act as a fulcrum (e.g., a point on which the bracket or a portion of the bracket can pivot, etc.). The number of springs can provide a force to push the bracket (e.g., scissor handle assembly bracket, etc.) upward into an angular position which is illustrated further in reference to FIG. 2.

The tool-less multipoint latching mechanism can be coupled to a PCA. The PCA can be a daughter card that is to be installed on a computing board (e.g., motherboard, etc.). The PCA can include multiple connectors (e.g., pin connectors, etc.) that can be coupled to receiving connectors on the computing board. The PCA may have to be vertically lowered (e.g., lowered in a symmetric fashion, etc.) in order to properly connect the PCA connectors to the receiving connectors of the computing board. For example, if the PCA were lowered at an angle, the PCA connectors and/or the receiving connectors of the computing board may be damaged.

The tool-less multipoint latching mechanism can include a number of cams (e.g., face cam, etc.) that can interact with a number of cam surfaces of the computing board. The number of cams and/or cam surfaces can be adjustable so the tool-less multipoint latching mechanism can be configured for a number of different PCA connector types and/or a number of different receiving connector types. In addition, the number of cams and/or cam surfaces can be adjustable so the tool-less multipoint latching mechanism can be configured for a number of different receiving connector heights (e.g., relative height of the receiving connector, relative height of a plurality of different receiving connectors for a particular PGA, etc.).

The cams of the tool-less multipoint latching mechanism can be coupled to the cam surfaces of the computing board. Coupling the cams of the tool-less multipoint latching mechanism to the cam surfaces can place the PCA in a position to couple the PCA connectors to the receiving connectors of the computing board. In some examples, pressure can be applied to a support bar that is coupled to the tool-less multipoint latching mechanism and the pressure can move the tool-less multipoint latching mechanism rotationally downward and also vertically lower (e.g., lower in a vertical position, lower such that PCA connectors are coupled to receiving connectors, lowered in a symmetric fashion, etc.) the coupled PCA into a number of receiving connectors on the computing board.

In some examples, the tool-less multipoint latching mechanism can include a locking mechanism to prevent the springs from pushing the bracket upward into an angular position. The locking mechanism can prevent the coupled PCA from being removed from the receiving connectors of the computing board. In addition, the locking mechanism can be utilized to remove the PCA from the computing board. For example, the locking mechanism can be a tool-less locking mechanism (e.g., rocker latch, mechanism that can be release without the use of a tool, locking mechanism that can be released by hand, etc.) that when released by a user can vertically raise the position of the tool-less multipoint latching mechanism and the coupled PCA can be removed.

The tool-less multipoint latching mechanism as described herein can provide a blind mate mechanism (e.g., coupling connectors without the use of guides, etc.) for installing a number of different PCAs. The tool-less multipoint latching mechanism can provide easy installation and removal of PCAs without the use of tools and/or without a risk of damaging the PCA connectors and/or the receiving connectors of the computing board.

FIG. 1 illustrates a diagram of an example of a tool-less multipoint latching mechanism system 100 consistent with the present disclosure. The tool-less multipoint latching mechanism system 100 can represent the system in a locked position. In the locked position, the printed circuit assembly (PCA) 102 can be coupled to a computing board (e.g., motherboard, etc.) via a number of connectors. For example, a number of PCA connectors can be coupled to a number of receiving connectors of the computing board. In addition, the locked position can be a position where a locking mechanism 106 is in a locked position (e.g., preventing a number of springs 116, 118 from vertically raising the coupled PCA 102, etc.).

The tool-less multipoint latching mechanism system 100 can include a PCA 102 coupled to a bracket by a number of locking locations 104-1, 104-2. The number of locking locations can include screw locations. For example, the number of locking locations 104-1, 104-2 can include a female thread coupled to the PCA 102 and a screw or bolt can be utilized to couple the bracket to the PCA 102 at the number of locking locations 104-1, 104-2.

The bracket can include a number of cams 108-1, 108-2, 110-1, 110-2. The number of cams 108-1, 108-2, 110-1, 110-2 can be utilized to position the system 100 over a particular portion of a computing board. For example, the computing board can include a number of cam surfaces to receive the number of cams 108-1, 108-2, 110-1, 110-2. The number of cams 108-1, 108-2, 110-1, 110-2 can be adjustable in order to configure a locked position (e.g., position when locking mechanism 106 is in a locked position, etc.). For example, the number of cams 108-1, 108-2, 110-1, 110-2 can be adjusted based on a connector type of the PCA 102 and/or a connector type of the computing board. In another example, the number of cams 108-1, 108-2, 110-1, 110-2 can be adjusted based on a connector height of the PCA 102 and/or a connector height of the computing board.

The adjustments to the number of cams 108-1, 108-2, 110-1, 110-2 can be performed to vertically lower the coupled PCA 102 into a number of receiving connectors on the computing board. Vertically lowering the coupled PCA 102 into the number of receiving connectors on the computing board can prevent the connectors of the PCA 102 and/or the receiving connectors of the computing board from being bent or damaged by improper coupling (e.g., angled coupling, misaligned coupling, etc.).

The bracket can also include a number of springs 116, 118 (e.g., torsion springs, etc.) to act as a fulcrum between a corresponding cam and a corresponding pin-in-slot joint 112-1, 112-2. For example, the spring 116 can act as a fulcrum between the cam 108-1 and the pin-in-joint 112-1. In another example, the spring 118 can act as fulcrum between a cam 108-2 and the pin-in-slot joint 112-2. An additional number of springs can be located on each opposing side of the bracket, but are not shown. The number of springs 116, 118 can provide a force and/or pressure on the number of cams 108-1, 108-2, to elevate the pin-in-slot joints 112-1, 112-2 to an elevated position. In the locked position, however the locking mechanism 106 prevents the number of springs 116, 118 from elevating the pin-in-slot joints 112-1, 112-2 to the elevated position.

The bracket can include a number of pin-in-slot joints 112-1, 112-2. The number of pin-in-slot joints 112-1, 112-2 can include a slot portion that is coupled to a first portion of the bracket and a pin portion that is coupled to a second portion of the bracket. The number of pin-in-slot joints 112-1, 112-2 can enable the bracket to be elevated by the number of springs 116, 118 to an elevated position. The elevated position can be the same and or similar to the elevated position as referenced in FIG. 2.

The bracket can include a support bar 114. The support bar 114 can be utilized to apply a force or pressure on the bracket and to vertically lower the PCA 102. The support bar 114 can be coupled to a portion of the bracket (e.g., one side of the pin-in-slot joints 112-1, 112-2, etc.). The support bar 114 can provide stability to the system 100 by being coupled to a first side and a second side of the portion of the bracket. The support bar 114 can be utilized to apply pressure that overcomes the pressure of the springs 116, 118 to vertically lower the PCA 102 into the number of receiving connectors on the computing board. That is, the support bar 114 extending from a first side of the bracket to a second side of the bracket can be used to enable pressure to be applied to the bracket and to vertically lower the coupled PCA into a number of receiving connectors on the computing board while rotationally moving the support bar 114 and locking mechanism 106 to the locked position.

The support bar 114 can also be utilized to remove the PCA 102 from the computing board when the bracket is in the elevated position. For example, a user can use the support bar 114 to apply a force to remove the PCA 102 from the computing board. In some examples, the support bar 114 can be utilized to place the locking mechanism 106. The locking mechanism 106 can be utilized to prevent the springs 116, 118 from elevating the bracket to the elevated position. In addition, the locking mechanism 106 can be utilized to prevent the number of pin-in-slot joints 112-1, 112-2 of the bracket from interacting with the number of adjustable cams 108-1, 108-2, 110-1, 110-2 to vertically raise the coupled PCA 102 from the number of receiving connectors on the computing board. That is, the locking mechanism 106 can prevent the PCA 102 from being moved out of a particular position. In some examples, the locking mechanism 106 is a rocker style locking mechanism. The rocker style locking mechanism can remain in a locked position until a force is applied to "rock" the locking mechanism to an unlocked position. That is, a user can apply a force to the locking mechanism 106 to "rock" the locking mechanism 106 into an unlocked position and allow the springs 116, 118 to elevate the bracket into an elevated position (e.g., unlocked position).

The system 100 can provide an effective tool-less blind mate coupling of a PCA 102 to a computing board. The system 100 can also provide an effective tool-less uncoupling of the PCA 102 from the computing board. The system 100 can also include adjustable cams 108-1, 108-2, 110-1, 110-2 that can be configured to install and/or remove a plurality of different PCA types with a variety of different connector types.

Figure 2:
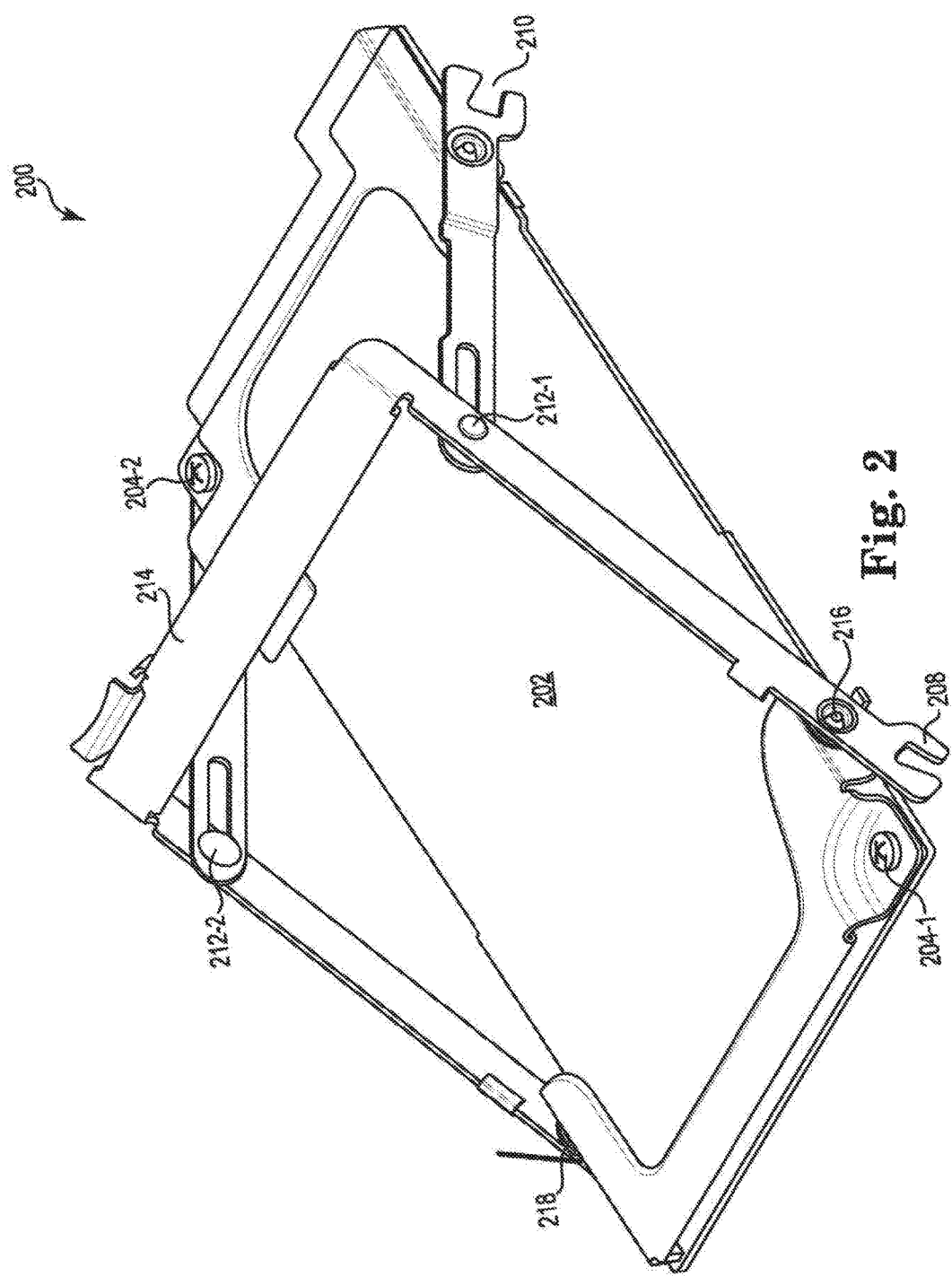
FIG. 2 illustrates a diagram of an example of a tool-less multipoint latching mechanism system consistent with the present disclosure.

FIG. 2 illustrates a diagram of an example of a tool-less multipoint latching mechanism system 200 consistent with the present disclosure. The tool-less multipoint latching mechanism system 200 can represent the system in an unlocked position. In the unlocked position, the printed circuit assembly (PCA) 202 can be uncoupled from a computing board (e.g., not connected to the receiving connectors of the computing board, etc.). The system 200 can function in the same and/or similar manner as system 100 as referenced in FIG. 1.

The system 200 can include a PCA 202 coupled to a bracket assembly (e.g., bracket, etc.). The bracket can be coupled to the PCA 202 via a number of locking locations 204-1, 204-2. The number of locking locations 204-1, 204-2 can include locations on the PCA 202 that can receive a screw or bolt to couple the PCA 202 to the bracket. The number of locking locations 204-1, 204-2 can include permanent or semi-permanent coupling of the PCA 202 to the bracket.

As described herein, the system 200 can include a number of springs 216, 218 (e.g., torsion springs, etc.). The number of springs 216, 218 can act as a fulcrum between a corresponding cam and a corresponding pin-in-slot joint 212-1, 212-2. For example, the spring 216 can act as a fulcrum between the cam 208 and the pin-in-joint 212-1. In another example, the spring 218 can act as fulcrum between the corresponding cam (not shown) and the pin-in-slot joint 212-2. The number of springs 216, 218 can provide a force and/or pressure on the number of cams 208, 210 to elevate the pin-in-slot joints 212-1, 212-2 to the elevated position as shown. As described herein, the springs 216, 218 can provide the force and/or pressure to elevate the bracket to the elevated position when the locking mechanism 206 is in an unlock position. For example, the springs 216, 218 can vertically elevate the PCA 202 from a number of receiving connectors and also raise a support bar 214 to the elevated position as shown when the locking mechanism 206 is put in an unlock position.

In some examples, the support bar 214 can be utilized to lift the PCA 202 and bracket from the computing board. For example, the support bar 214 can be utilized to vertically lift and/or remove the system 200 from the computing board. In this example, there can be hardware and/or other devices that can make grabbing the PCA 202 directly a difficult task. With the support bar 214 at an elevated position, the bracket and PCA 202 can be more easily removed from the computing board.

Figure 3:
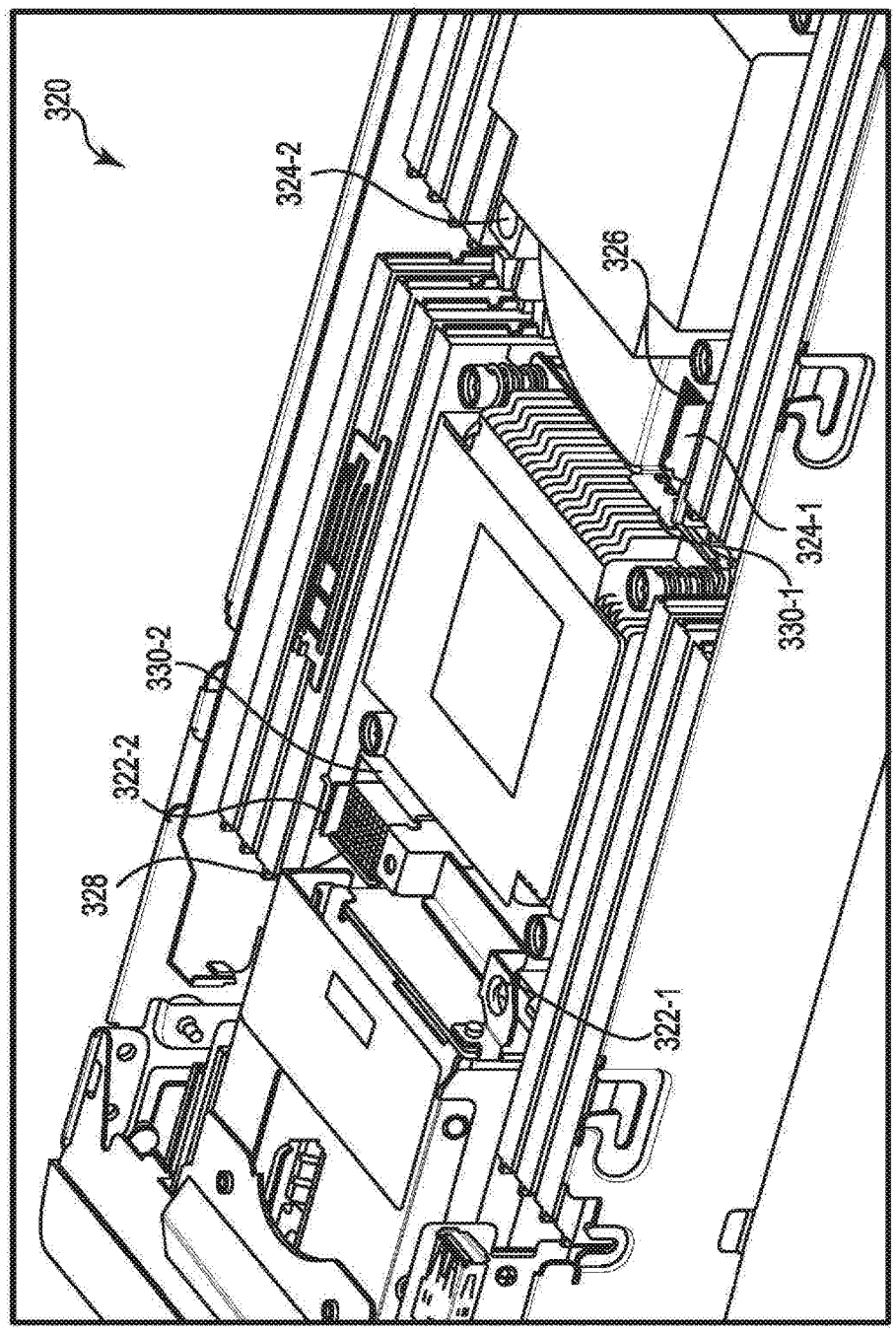
FIG. 3 illustrates a diagram of an example of a computing system board consistent with the present disclosure.

FIG. 3 illustrates a diagram of an example of a computing system board 320 consistent with the present disclosure. The computing system board 320 can be an example of a computing board as described herein. The computing system board 320 can include a number of receiving connectors 326, 328 that can be utilized to couple a printed circuit assembly (PCA) (e.g., PCA 102 as referenced in FIG. 1, PCA 202 as referenced in FIG. 2, etc.).

The number of receiving connectors 326, 328 can be the same and/or different types of connectors for coupling a PCA to the computing system board 320. The receiving connectors 326, 328 can also be at the same and/or different heights relative to the bottom of the computing system board 320. As described herein, the tool-less multipoint latching mechanism system can accommodate these different types of receiving connectors 326, 328 as well as the variations in height between the receiving connectors 326, 328 by adjusting the cams of the bracket and/or cam surfaces 322-1, 322-2, 324-1, 324-2 of the computing system board 320.

The cam surfaces 322-1, 322-2, 324-1, 324-2 can interact with the cams of the bracket as described herein. In some examples, the cam surfaces can receive the cam and interact with the cam to vertically lower or vertically raise a PCA to the number of receiving connectors 326, 328. As described herein, the cams of the bracket can interact with the cam surfaces 322-1, 322-2, 324-1, 324-2 to align the PCA connectors and the receiving connectors 326, 328 prior to vertically lowering the PCA into the number of receiving connectors 326, 328.

In some examples, the system 320 can include a number of lead-in guides 330-1, 330-2 coupled to the number of receiving connectors 326, 328. The number of lead-in guides 330-1, 330-2 can be utilized to guide the PCA connectors into the number of receiving connectors 326, 328.

Figure 4:
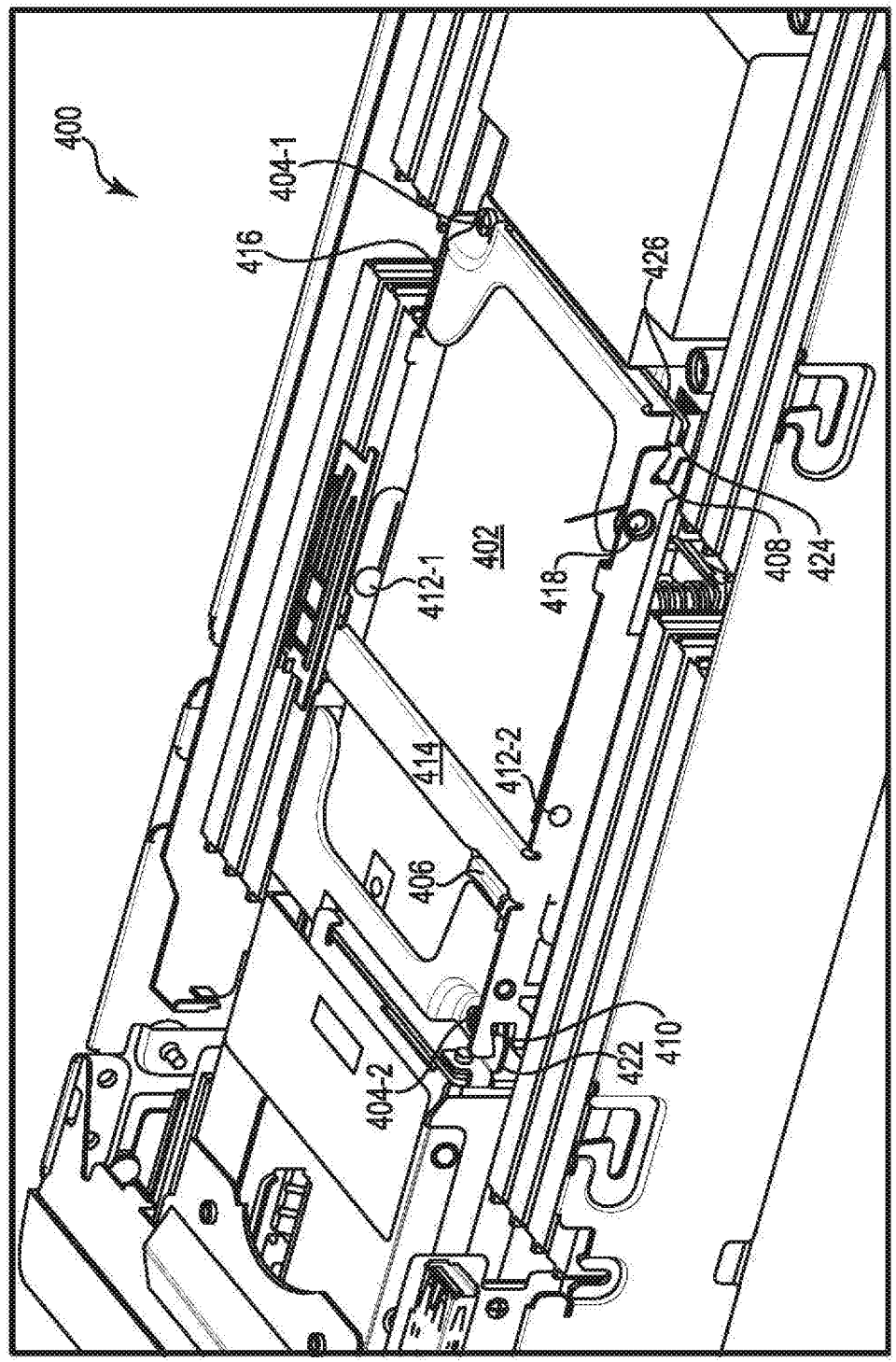
FIG. 4 illustrates a diagram of an example of a tool-less multipoint latching mechanism system consistent with the present disclosure.

FIG. 4 illustrates a diagram of an example of a tool-less multipoint latching mechanism system 400 consistent with the present disclosure. FIG. 4 illustrates a diagram of an example of the tool-less multipoint latching mechanism that is in a locked position with a PCA 402 coupled to a computing board.

The tool-less multipoint latching mechanism system 400 can include the PCA 402 coupled to a bracket via a number of locking locations 404-1, 404-2 as described herein. The system 400 can include a number of cams 408, 410 that interact with a number of corresponding cam surfaces 424, 422. The system can also include a number of springs 416, 418 that can act as a fulcrum between the number of cams 408, 410 and a corresponding pin-in-slot joint 412-1, 412-2 as described herein.

The system 400 can also include a locking mechanism 406 coupled to a support bar 414 to prevent the springs from elevating the bracket to an elevated position as described herein. The system 400 can be altered to the elevated position by applying pressure to the locking mechanism 406. In some examples, applying pressure to the locking mechanism 406 can put the locking mechanism 406 into an unlocked position and allowing the springs 416, 418 to elevate the PCA 402 from the receiving connectors 426 and elevate the support bar 414 as described herein.

In some examples, the system 400 can include a first portion of a bracket coupled to a second portion of the bracket via a number of pin-in-slot joints 412-1, 412-2, a first locking location 404-2 of the first portion of the bracket coupled to a PCA 402 and a second locking location 404-1 of the second portion of the bracket coupled to the PCA 402, a first set of adjustable cams 410 of the first portion of the bracket to interact with a number of corresponding cam surfaces 422 located on a computing board, a second set of adjustable cams 408 of the second portion of the bracket to interact with a number of corresponding cam surfaces 424 located on the computing board, and a support bar 414 of the first portion of the bracket to receive pressure and vertically lower the coupled PCA 402 into a number of receiving connectors 426 on the computing board via an interaction between the first set of adjustable cams 410 and the number of corresponding cam surfaces 422 and an interaction between the second set of adjustable cams 408 and the number of corresponding cam surfaces 424 created by the applied pressure to the support bar 414.

In another implementation, a system 400 for a tool-less multipoint latching mechanism can include a PCA 402 coupled to a bracket comprising: at least four adjustable cams 408, 410 located at each corner of the bracket, at least two springs 416, 418 to vertically raise the coupled PCA 402 via the adjustable cams 408, 410, at least two pin-in-slot joints 412-1, 412-2 on each side of the bracket to enable a support bar 414 coupled to the bracket to move rotationally upward and downward via the springs 416, 418 and adjustable cams 408, 410, and a locking mechanism 406 coupled to the support bar 414 to prevent the coupled PCA 402 from altering a locked position.

As used herein, "a" or "a number of" something can refer to one or more such things. For example, "a number of widgets" can refer to one or more widgets. The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed is:

1. A system for a tool-less multipoint latching mechanism, comprising:
   a number of adjustable cams of a bracket to interact with a number of corresponding cam surfaces located on a computing board;
   a number of locking locations to couple a printed circuit assembly (PCA) to the bracket,
   wherein the PCA is horizontally aligned in parallel with the computing board;
   a number of pin-in-slot joints of the bracket that interact with the number of adjustable cams to vertically lower the PCA into a number of receiving connectors on the computing board; and
   at least one spring disposed between each corresponding adjustable cam and each corresponding pin-in-slot joint, and configured as a torsion spring to act as a fulcrum applying a torsion in a plane perpendicular to a spring axis to enable a support bar coupled to the bracket to move rotationally upward and downward along the plane perpendicular to the spring axis,
wherein the at least one spring provides force for elevating the corresponding pin-in-slot joint, wherein:
the number of locking locations comprise screw locations to couple the PCA to the bracket, and
the support bar extends from a first side of the bracket to a second side of the bracket to enable pressure to be applied to the bracket and to vertically lower the PCA into the number of receiving connectors on the computing board.

2. The system of claim 1, comprising a locking mechanism to prevent the number of pin-in-slot joints of the bracket from interacting with the number of adjustable cams to vertically raise the PCA from the number of receiving connectors on the computing board.

3. The system of claim 2, wherein the locking mechanism is a tool-less locking mechanism.

4. The system of claim 1, wherein the at least one spring interacts with the number of pin-in-slot joints and the number of adjustable cams to vertically raise the PCA from the number of receiving connectors when a locking mechanism is in an unlocked position.

5. The system of claim 1, wherein the bracket utilizes a blind mate system to vertically lower the PCA into the number of receiving connectors on the computing board.

6. A system for a tool-less multipoint latching mechanism, comprising:
a first portion of a bracket coupled to a second portion of the bracket via a number of pin-in-slot joints;
a first locking location of the first portion of the bracket coupled to a printed circuit assembly (PCA) and a second locking location of the second portion of the bracket coupled to the PCA,
wherein the PCA is horizontally aligned in parallel with a computing board;
a first set of adjustable cams of the first portion of the bracket to interact with a number of corresponding cam surfaces located on the computing board; a second set of adjustable cams of the second portion of the bracket to interact with a number of corresponding cam surfaces located on the computing board;
a support bar of the first portion of the bracket to receive pressure and vertically lower the PCA into a number of receiving connectors on the computing board via an interaction between the first set of adjustable cams and the number of corresponding cam surfaces and an interaction between the second set of adjustable cams and the number of corresponding cam surfaces created by an applied pressure to the support bar; and
at least one spring disposed between each corresponding set of adjustable cams and a corresponding pin-in-slot joint of the number of pin-in-slot joints, and configured as a torsion spring to act as a fulcrum applying a torsion in a plane perpendicular to a spring axis to enable the support bar coupled to the bracket to move rotationally upward and downward along the plane perpendicular to the spring axis,
wherein the applied pressure to the support bar overcomes an elevating force produced by the at least one spring,
wherein the first locking location and the second locking location comprise screw locations to couple the PCA to the bracket.

7. The system of claim 6, comprising a locking mechanism coupled to the support bar to prevent a number of springs from vertically raising the PCA from the number of receiving connectors on the computing board.

8. The system of claim 7, wherein the number of springs are positioned as a fulcrum between the first set of adjustable cams and second set of adjustable cams and the number of pin-in-slot joints.

9. The system of claim 6, wherein the first set of adjustable cams are adjusted based on a position of a first receiving connector of the number of receiving connectors and the second set of adjustable cams are adjusted based on a position of a second receiving connector of the number of receiving connectors.

10. A system for a tool-less multipoint latching mechanism, comprising:
a printed circuit assembly (PCA) horizontally aligned in parallel with a computing board, and coupled to a bracket,
the bracket comprising:
at least four adjustable cams located at each corner of the bracket;
at least two torsion springs to vertically raise the PCA via the at least four adjustable cams, and configured to act as a fulcrum applying a torsion in a plane perpendicular to a spring axis to enable a support bar coupled to the bracket to move rotationally upward and downward along the plane perpendicular to the spring axis;
at least one pin-in-slot joint on each side of the bracket to enable the support bar coupled to the bracket to move rotationally upward and downward via the at least two torsion springs and the at least four adjustable cams; and
a locking mechanism coupled to the support bar to prevent the PCA from altering a locked position,
wherein the support bar extends from a first side of the bracket to a second side of the bracket to enable pressure to be applied to the bracket and to vertically lower the PCA into a number of receiving connectors on the computing board.

11. The system of claim 10, wherein each of the at least two torsion springs include a terminal engaged with the bracket to enable the at least two torsion springs to act as a fulcrum between a corresponding adjustable cam and the pin-in-slot joints to move the support bar in a rotationally upward and downward direction.

12. The system of claim 10, wherein the at least four adjustable cams can each interact with a corresponding cam surface on a computing board.

13. The system of claim 12, wherein the PCA is blindly coupled to a plurality of receiving connectors on the computing board when the bracket is in the locked position.

* * * * *